US010247285B2

(12) United States Patent
Sobolak (10) Patent No.: US 10,247,285 B2
(45) Date of Patent: Apr. 2, 2019

(54) LOCKING AND UNLOCKING MECHANISM FOR RAM AIR TURBINE (71) Applicant: Hamilton Sundstrand Corporation, Charlotte, NC (US)

(72) Inventor: Piotr Sobolak, Słupsk (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/363,632

(22) Filed: Nov. 29, 2016

(65) Prior Publication Data
US 2017/0204950 A1 Jul. 20, 2017

(30) Foreign Application Priority Data

Jan. 20, 2016 (EP) .................................. 16152046

(51) Int. Cl.
B64D 41/00 (2006.01)
F16H 21/08 (2006.01)
F16H 21/44 (2006.01)
F16H 25/18 (2006.01)
F16H 37/12 (2006.01)

(52) U.S. Cl.
CPC ........... F16H 21/08 (2013.01); B64D 41/007 (2013.01); F16H 21/44 (2013.01); F16H 25/18 (2013.01); F16H 37/12 (2013.01)

(58) Field of Classification Search
CPC ........ B64D 41/007; G05G 5/005; G05G 5/02; G05G 5/04; G05G 5/06; G05G 5/065; G05G 5/08; G05G 5/28; F16H 21/08; F16H 21/44; F16H 25/18; F16H 37/12; B64C 25/26; E05B 47/0001; F15B 15/26; F15B 15/261; F15B 15/265
See application file for complete search history.

(56) References Cited

U.S. PATENT DOCUMENTS 5,288,037 A * 2/1994 Derrien .................. B64C 25/26
244/102 SL
6,802,476 B2 * 10/2004 Collet ..................... B64C 25/26
244/100 R
(Continued)

FOREIGN PATENT DOCUMENTS

EP 1342663 A1 9/2003
WO 2005005252 A1 1/2005

OTHER PUBLICATIONS

European Search Report for Application No. 16152046.5-1754; dated Jul. 11, 2016; 5 pages.

Primary Examiner — Richard W Ridley
Assistant Examiner — Brian J McGovern
(74) Attorney, Agent, or Firm — Cantor Colburn LLP (57) ABSTRACT A locking mechanism comprising a linkage assembly comprising a first link and a second link joined at a pivot point; a linkage assembly spring to bias the linkage assembly into a first, locked, position; a cam assembly having a cam 1 with a cam surface in engagement with the linkage assembly; a cam biasing member such as a spring arranged to bias the cam surface to press against the linkage assembly sufficiently to overcome the linkage assembly spring and to force the linkage assembly into a second, unlocked position; and a solenoid assembly arranged to engage the cam in a locked position in which the cam is prevented from forcing the linkage assembly into the unlocked position.

5 Claims, 6 Drawing Sheets (56) References Cited

U.S. PATENT DOCUMENTS

| | | | |
|---|---|---|---|
| 8,640,563 | B2 | 2/2014 | Lang et al. |
| 9,193,472 | B2 | 11/2015 | Sasscer |
| 2013/0078026 | A1 | 3/2013 | Sasscer et al. |
| 2013/0327207 | A1 | 12/2013 | Sasscer et al. |
| 2015/0096437 | A1 | 4/2015 | Russ |
| 2015/0232195 | A1 | 8/2015 | Bannon |

* cited by examiner

LOCKING AND UNLOCKING MECHANISM FOR RAM AIR TURBINE

FOREIGN PRIORITY

This application claims priority to European Patent Application No. 16152046.5 filed Jan. 20, 2016, the entire contents of which is incorporated herein by reference.

TECHNICAL FIELD

The present disclosure relates to locking/unlocking mechanisms for deployable components. The mechanism is particularly suitable as an unlocking mechanism for a ram air turbine (RAT) actuator but could also find application in other deployable or movable systems such as other actuators, valves, pumps and the like.

BACKGROUND

Many systems and mechanisms are known in which a component is movable between a closed or stowed position and an open or deployed position, and wherein a component should be locked in the desired position and unlocked to permit movement between the positions. Particular examples are valves or actuators, such as RAT actuators as described in more detail below.

Locking mechanisms are known to secure the actuator, valve etc. in a particular position, and unlocking mechanisms are known to release the locking mechanism and permit movement of the actuator/valve components to a different position, whereupon the actuator components can then also be locked in the second position by means of a locking mechanism. A locking mechanism for a RAT actuator is disclosed, for example, in US 2013/0327207.

Ram air turbines are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn, due to the airflow, and generates electrical and/or hydraulic power. The RAT is typically pivoted into position by means of an actuator, for example a hydraulic actuator. The actuator typically includes a bolt which extends to deploy the RAT. The actuator has a lock mechanism which prevents inadvertent movement of the bolt and, thus, inadvertent deployment of the RAT. The main locking mechanism typically comprises a spring loaded lock bolt which must be moved in an axial direction to unlock the actuator. Such an actuator is disclosed, for example, in US 2015/0232195. RAT actuators are also disclosed in U.S. Pat. Nos. 8,640,563, 9,193,472 and US 2015/0096437.

An unlocking mechanism is provided to permit the axial bolt movement. A conventional unlocking mechanism is shown, for example, in FIGS. 2A and 2B, comprising a linkage arrangement, one end of which is rotatably coupled to one end of the lock bolt and the other end of which is axially fixed and rotatably coupled to, for example, a mounting wall. A solenoid moves the link between a locked (FIG. 2A) and an unlocked (FIG. 2B) position. In the locked position, the linkage system pushes against the lock bolt against the force of the lock bolt spring to prevent axial movement of the bolt. When it is required to deploy the RAT, the bolt needs to be released for axial movement of the actuator. As seen in FIG. 2B, a pull force is exerted on the linkage assembly by means of a solenoid, which moves the linkage assembly out of engagement with the bolt. This allows the lock bolt to move axially to initiate actuator unlocking to permit deployment. The solenoid must have sufficient force to displace the lock bolt against the force of the lock bolt spring and the linkages and joints require sufficient axial and radial space and may also be prone to wear or damage.

The size and weight of components is of particular concern in aircraft where there is a desire to use lighter and smaller components, whilst maintaining safety and reliability.

There is a desire, therefore, to provide a locking/unlocking mechanism for such systems to prevent/permit axial movement of a component such as a lock bolt, without the need for such large solenoids and a series of links.

SUMMARY

The present invention provides a locking mechanism comprising a linkage assembly comprising a first link and a second link joined at a pivot point; a linkage assembly spring to bias the linkage assembly into a first, locked, position; a cam assembly having a cam surface in engagement with the linkage assembly; a cam biasing member, such as a spring, arranged to bias the cam surface to press against the linkage assembly sufficiently to overcome the linkage assembly spring and to force the linkage assembly into a second, unlocked position; and a solenoid assembly arranged to engage the cam in a locked position in which the cam is prevented from forcing the linkage assembly into the unlocked position.

The mechanism preferably has two solenoid assemblies on opposite sides of the cam assembly.

The or each solenoid assembly preferably comprises a solenoid plunger tip moveable into locking engagement with the cam, e.g. by engaging in a detent in the cam.

BRIEF DESCRIPTION OF THE DRAWINGS

Preferred embodiments will now be described by way of example only and with reference to the accompanying drawings in which.

DETAILED DESCRIPTION

Figure 1:
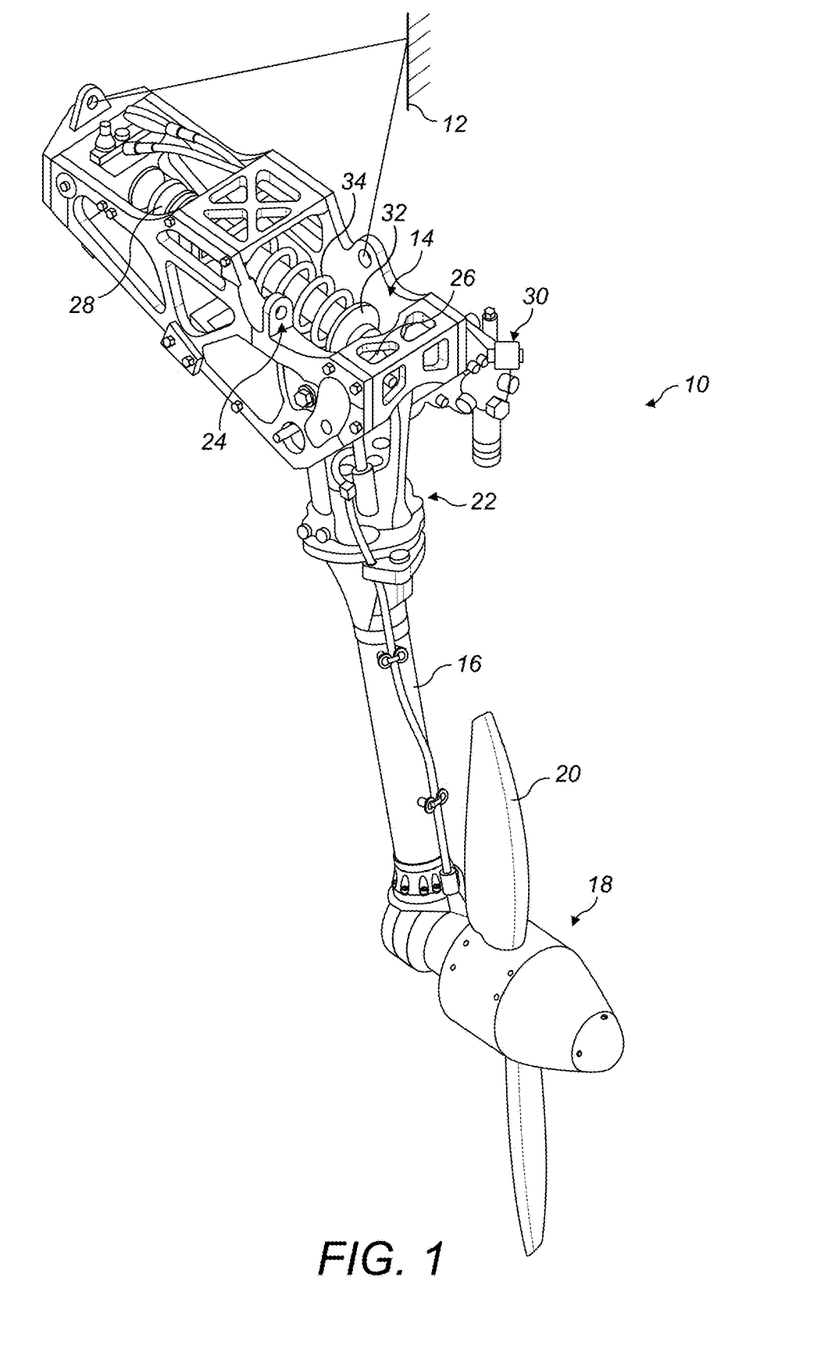
FIG. 1 shows a ram air turbine (RAT)

FIG. 1 shows an RAT system 10 which is secured to an aircraft structure 12 by housing 14. The housing 14 pivotally supports a strut 16 having a turbine 18 at one end. The turbine 18 includes blades 20 which impart rotational drive to a generator 22 and a hydraulic pump 30, for example. An actuator 24 is secured to the strut at a first end 26 and to the housing at a second end 28. The actuator 24 is illustrated in its deployed position. The actuator 24 comprises a cylinder 32 which is biased by a spring 34 in order to deploy the strut 16. When the cylinder 32 is retracted, it is held in its retracted position by means of a locking mechanism, details of which will be described below.

The unlocking of the actuator is initiated by permitting movement of the lock bolt 38. This is made possible by means of a release mechanism according to the present disclosure which will be described further below.

Figure 3A:
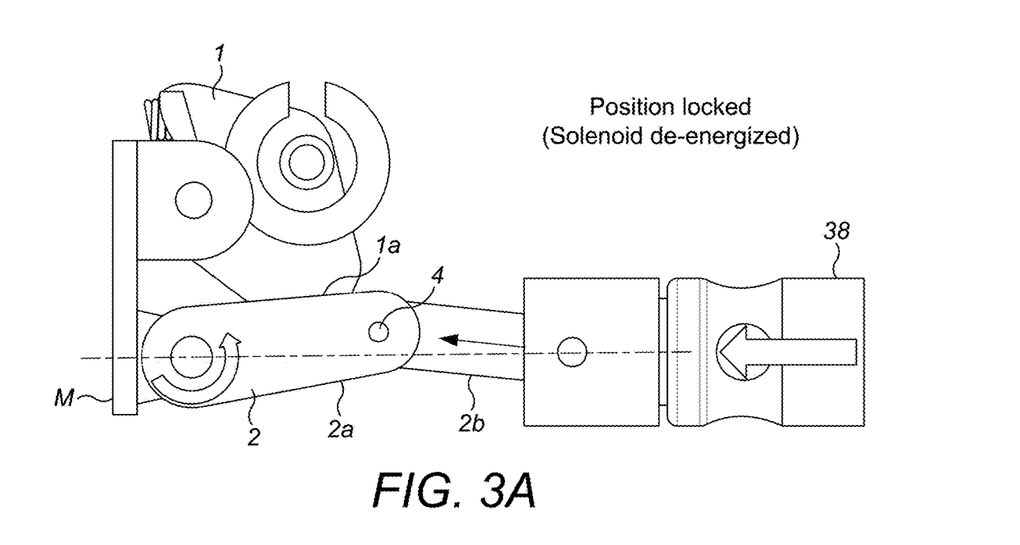
FIGS. 3a and 3b show a side view of the release mechanism of the present disclosure.
Figure 3B:
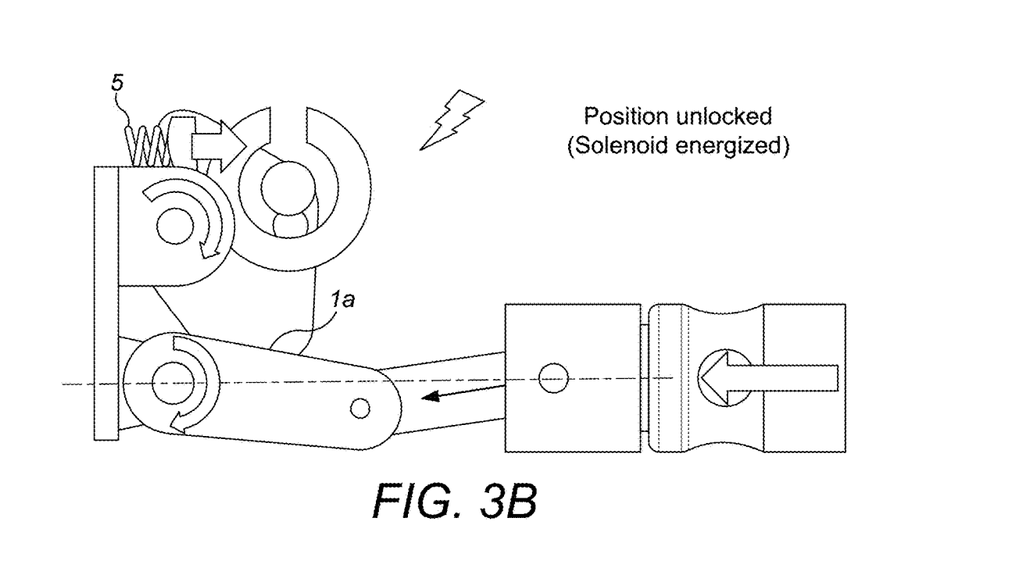

FIGS. 3*a* and 3*b* show a schematic view of the release mechanism of the present disclosure.

FIG. 3*a* shows the release mechanism in the locked position where axial movement of the lock bolt is prevented and, in FIG. 3*b*, in the unlocked position permitting movement of the lock bolt for deployment of the actuator.

Figure 4:
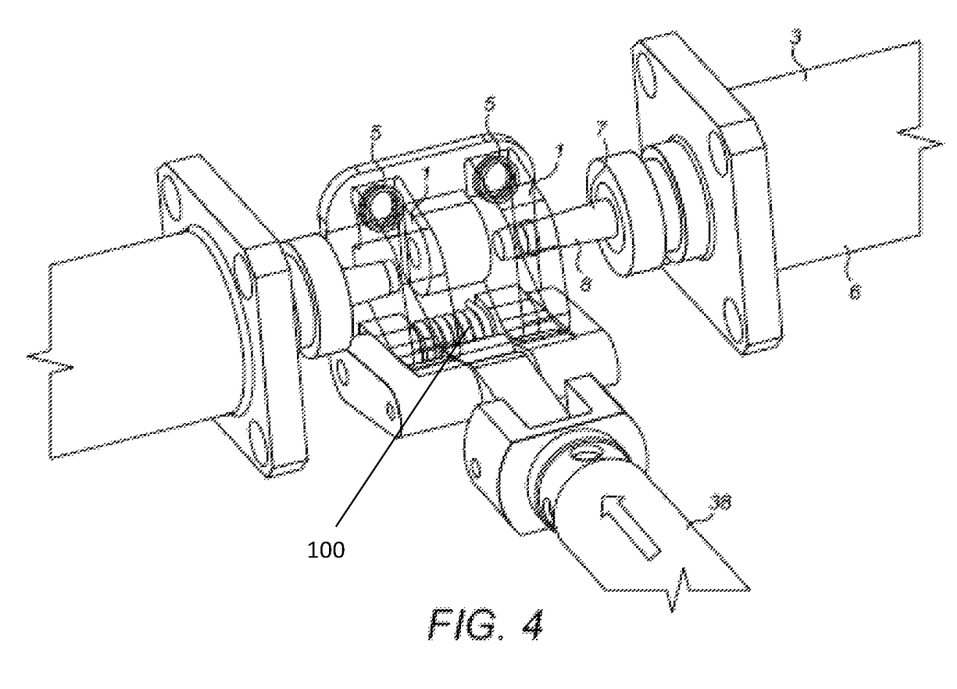
FIG. 4 shows a perspective view of the mechanism shown in FIGS. 3a and 3b.

FIG. 4 shows a perspective view of the arrangement of FIGS. 3*a* and 3*b*.

Figure 2A:
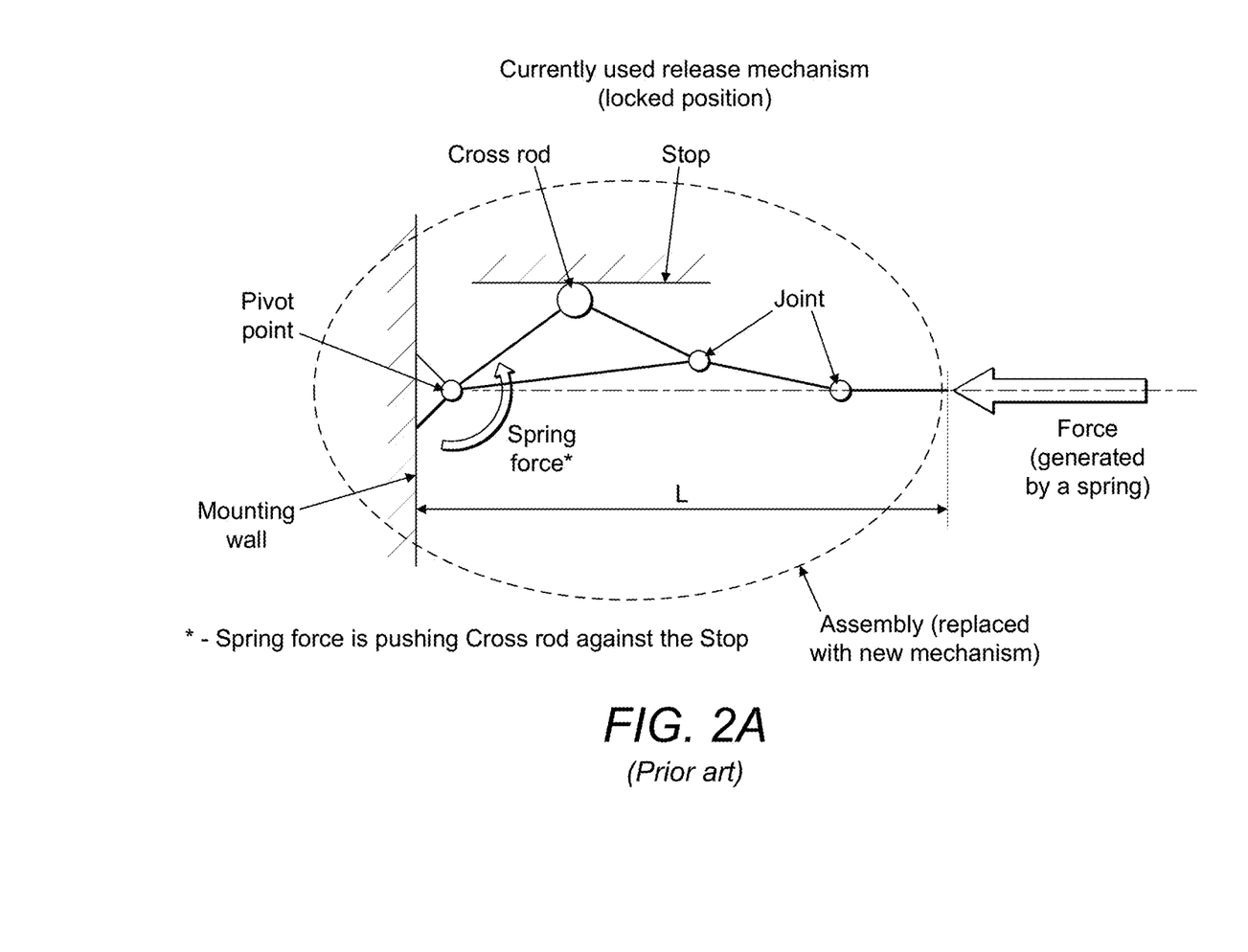
FIG. 2A shows a schematic view of a typical linkage release mechanism in the locked position.
Figure 2B:
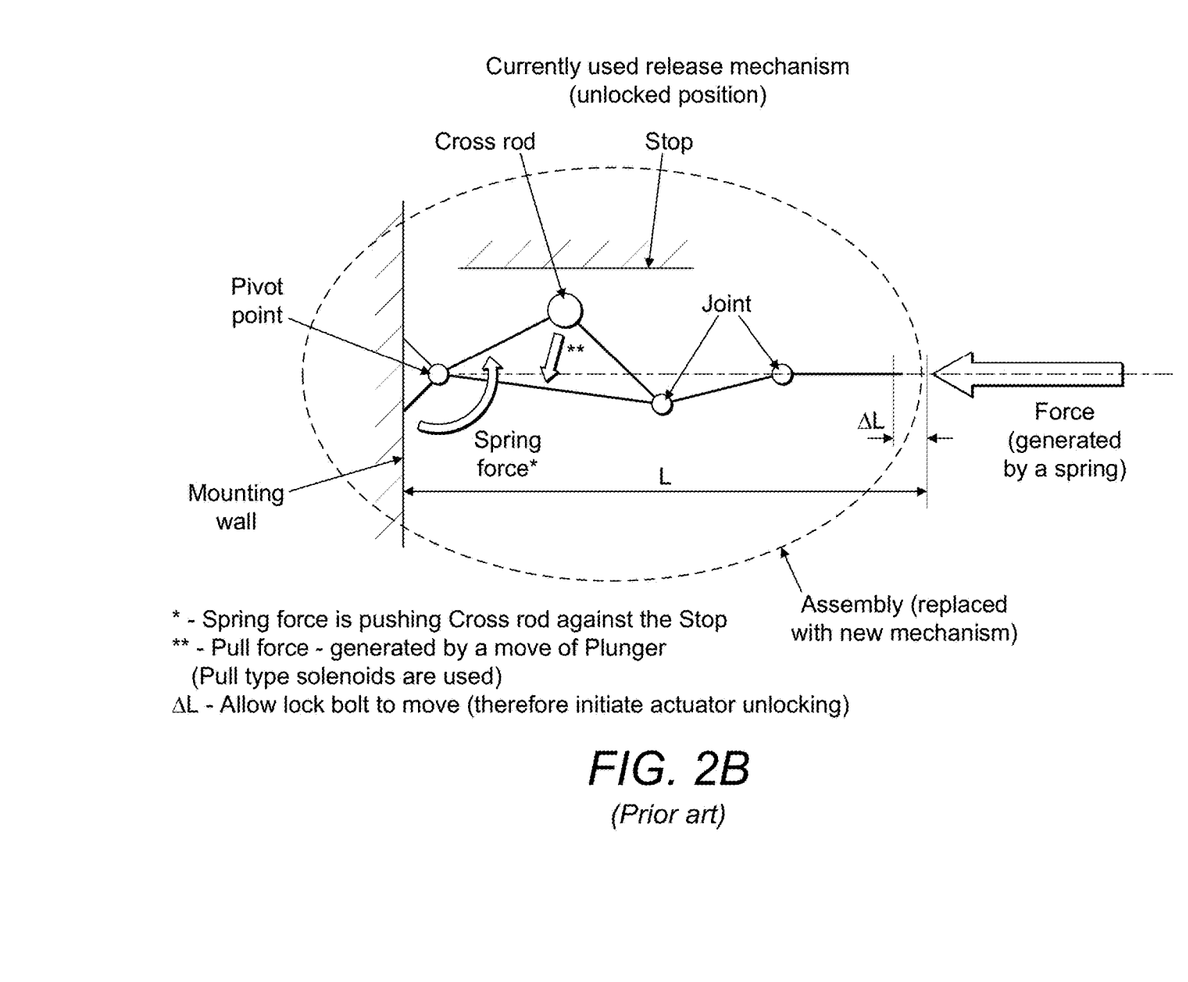
FIG. 2B shows the mechanism of FIG. 2A in the unlocked position.

The release mechanism of the present disclosure provides improved operation of the linkage mechanism as compared to the pull solenoid of FIGS. 2A and 2B. The release mechanism operates on the same type of linkage assembly as shown in FIGS. 2A and 2B and has the same objective, i.e. to cause a downward movement of the linkage assembly to permit axial movement of the lock bolt In the known systems, a pull-type solenoid actively pulls the cross-rod out of engagement with the stop against the spring force causing the linkage assembly to move away from, and hence release, the bolt. In contrast, in the arrangement of the present disclosure, a cam is held in its engaged position by the tip of a solenoid plunger engaging in the cam(s).

As described above, in prior art arrangements, a cross-rod passing through the linkage assembly abuts against a stop to prevent movement of the lock bolt; to unlock the bolt, a pull solenoid acts against the spring force biasing the cross-rod towards the stop, to pull the cross-rod away from the stop, causing the linkage assembly to move out of engagement with, and permit axial movement of the lock bolt.

The present disclosure replaces the pull solenoid and cross-rod with a cam assembly to cause the movement of the linkage assembly into and out of locking engagement with the lock bolt.

As can be seen, for example, in FIGS. 3*a*) and 3*b*), in a first, locked position, a cam 1 makes surface 1*a* contact with a first link 2*a* of the linkage assembly 2, but, as the cam is locked in position by one or more solenoid assemblies 3 (described further below), it does not exert force against the link to overcome the spring force M causing the link to pivot upwards, this causes the pivot point 4 between the first and second link 2*b* to take an upper position and the second link to extend to engage with, and prevent axial movement of the lock bolt 38 (as with the cross-bar abutting against the stop in existing systems).

To move the linkage assembly out of engagement with the lock bolt, to allow movement of the lock bolt, the cam is released by the solenoid(s) (described further below). A cam biasing member such as a spring 5 acting against the cam has sufficient force to overcome the force of the linkage assembly spring 100 and this forces the cam downwards to push, at cam surface 1*a*, against the first link. The first link thus pivots downwards about the pivot point, causing the second link to pivot upwards and out of engagement with the lock bolt. The lock bolt is then able to move axially.

In the perspective view of FIG. 4, it can be seen that the solenoid is de-energised and a solenoid spring biases the solenoid plunger tip into locking engagement with the cam so as to prevent rotation of the cam.

Figure 5A:
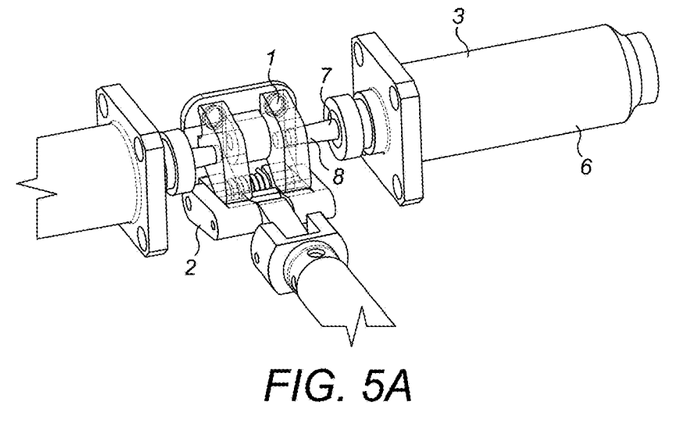
FIGS. 5a-5c show the operation of the mechanism shown in FIGS. 3 and 4.
Figure 5B:
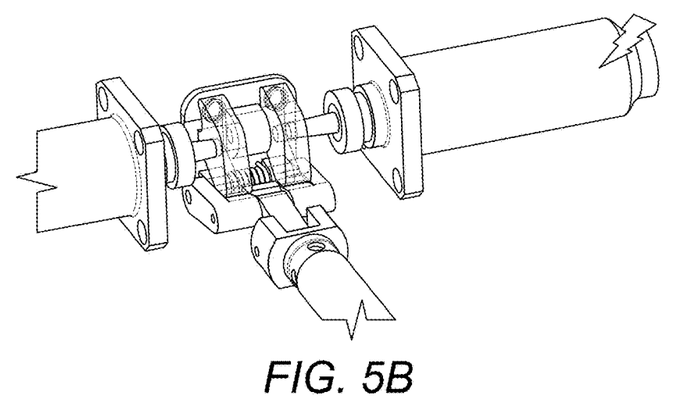
Figure 5C:
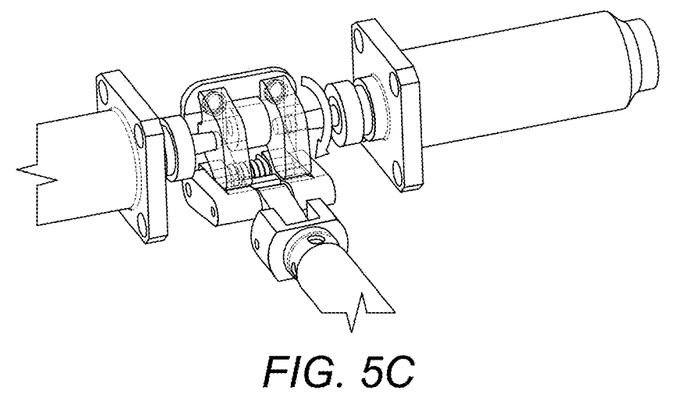

The solenoid assembly for locking/releasing the cam can be seen in FIGS. 5*a* to 5*c*. The examples show two solenoid assemblies acting on the cams. It is also possible to have just one assembly or, indeed, more than two.

The solenoid assembly comprises a solenoid 6, a solenoid plunger 7, a solenoid spring, biasing the plunger, and a solenoid plunger tip 8.

In the locked position, the solenoid is de-energised and so the solenoid spring biases the plunger, and hence the plunger tip, towards the cam such that the plunger tip engages with the cam, e.g. by engaging in an aperture or detent in the cam. This holds the cam such that it cannot move under the force of the cam spring to press against the linkage assembly.

To release the lock bolt, as shown in FIGS. 5*a* to 5*c*, the solenoid is energised, causing the plunger, and hence the plunger tip, to move against the bias of the solenoid spring, moving the tip out of engagement with the cam, the cam is then released to move under the force of the cam spring, moving the first link 2*a* away from the stop position and thus the linkage assembly 2 away from the bolt, allowing axial movement of the bolt.

The example shown comprises two solenoids. It is also possible to have one or perhaps even more than two solenoids arranged on either side of the cams to provide redundancy and extra engagement force. If two solenoids are used, the release mechanism reacts more quickly, and meets the requirements of aviation regulations for the duplication of critical systems.

In an alternative embodiment the solenoid could be in the locked position when the solenoid was energised and in the unlocked position when the solenoid is de-energised.

This mechanism could be easily adapted to existing actuators.

When the RAT is to be retracted to the stowed position, the lock bolt 38 is moved in the opposition direction.

The above is a description of a single embodiment by way of example only. Modifications may be made without departing from the scope of this disclosure.

While the apparatus has been described in the context of unlocking a RAT actuator, it may, as mentioned above, find use in other applications, for example of the types of actuator, valves, pumps or the like.

The invention claimed is:

1. A locking mechanism comprising a linkage assembly comprising:
    a first link and a second link joined at a pivot point;
    a linkage assembly spring to bias the linkage assembly into a first, locked, position, the linkage assembly spring is coaxial with a rotational axis of the first link;
    a cam assembly having a cam with a cam surface in engagement with the linkage assembly;
    a cam biasing member arranged to bias the cam surface to press against the linkage assembly sufficiently to overcome the linkage assembly spring and to force the linkage assembly into a second, unlocked position; and
    a solenoid assembly arranged to directly engage the cam in the locked position in which the cam is prevented from forcing the linkage assembly into the unlocked position.

2. The locking mechanism of claim 1, wherein said solenoid assembly comprises a solenoid plunger having a plunger tip wherein, in the locked position, the plunger tip is inserted into a detent in the cam to prevent a force of the cam biasing member from acting on the linkage assembly to move the linkage assembly from the locked position to the unlocked position.

3. The locking mechanism of claim 2, wherein said solenoid assembly is configured to bias the plunger tip into the detent in the cam when the solenoid is de-energised and the plunger tip is removed from within the detent in the cam when the solenoid is energised.

4. The locking mechanism of claim 2, wherein said solenoid assembly is configured to bias the plunger tip into the detent in the cam when the solenoid is energised and the plunger tip is removed from within the detent in the cam when the solenoid is de-energised.

5. The locking mechanism of claim 1, further comprising a second solenoid assembly arranged on an opposite side of the cam assembly to said solenoid assembly.

* * * * *